United States Patent [19]

Sundstrom

[11] Patent Number: 4,936,247

[45] Date of Patent: Jun. 26, 1990

[54] VISUAL AND TACTILE INDICATION OF COUPLING STATUS OF AN INTEGRATED DRIVE GENERATOR

[75] Inventor: Vernon L. Sundstrom, Rockford, Ill.

[73] Assignee: Sundstrand Corporation, Rockford, Ill.

[21] Appl. No.: 240,698

[22] Filed: Sep. 6, 1988

[51] Int. Cl.$^5$ .............................................. G08B 5/32
[52] U.S. Cl. .................................... 116/283; 116/281; 116/DIG. 21; 464/23
[58] Field of Search ............... 116/281, 283, 272, 233, 116/DIG. 21; 464/23

[56] References Cited

U.S. PATENT DOCUMENTS

| | | | |
|---|---|---|---|
| 3,282,387 | 11/1966 | Becker et al. | 192/150 |
| 3,546,897 | 12/1970 | Kenny | 464/38 |
| 3,696,639 | 10/1972 | Gore et al. | 464/23 |
| 4,058,079 | 11/1977 | Taylor et al. | 116/283 |
| 4,244,455 | 1/1981 | Loker | 192/24 |
| 4,651,670 | 3/1987 | Silverwater | 116/268 |

Primary Examiner—William A. Cuchlinski, Jr.
Assistant Examiner—W. Morris Worth
Attorney, Agent, or Firm—Antonelli, Terry & Wands

[57] ABSTRACT

An improved visual and tactile indicator (30) for indicating the status of a connection between a shaft (14) and a constant speed drive transmission (22) by a coupling mechanism (20) is disclosed. The invention utilizes a first movable member (32) which is movable along a longitudinal axis between first and second positions, the first position indicating that the shaft is connected to the rotary source of power and the second position indicating that the shaft is not connected to the rotary source of power and a second movable member (34) which is movable along a longitudinal axis between first and second positions, the second member being adjacent to the first member with the longitudinal axes being parallel. A locking mechanism (36) locks the first and second movable members longitudinally with respect to each other when the input shaft is coupled to the constant speed drive transmission by the coupling mechanism. The indicator of the present invention is immune to false indications caused by vibration or high inertial forces caused by landings of aircraft.

32 Claims, 3 Drawing Sheets

VISUAL AND TACTILE INDICATION OF COUPLING STATUS OF AN INTEGRATED DRIVE GENERATOR

DESCRIPTION

TECHNICAL FIELD

The present invention relates to indicators for providing a visual and tactile indication of coupling status of a shaft in a transmission to a source of rotary power. More particularly, the present invention relates to indicators of the foregoing type which provide a visual and tactile indication of the coupling status of a constant speed drive transmission which drives an electrical power generator from variable rotational velocity input power supplied from an aircraft propulsion engine to the constant speed drive transmission.

BACKGROUND ART

FIG. 1 illustrates a schematic diagram of a prior art status indicator utilized on the L1011 aircraft for providing a visual indication of the coupling status of the connection between rotary power applied from an aircraft propulsion engine (not illustrated) to input shaft 14 of an integrated drive generator (IDG) 16 of conventional construction. A more complete explanation of the status indicator is contained in pages 1–17 of the Sundstrand Aviation 90IDG01 Maintenance Manual. An IDG is an integral unit having a constant speed drive transmission which converts variable velocity rotary power inputted by shaft from an aircraft propulsion engine into a constant speed shaft drive which drives a power generator for producing constant frequency three phase 400 Hz electrical power. A constant speed drive (CSD) performs the same function as an IDG but is not an integral unit. The IDG 16 contains an internal coupling mechanism 20 which receives rotary power from shaft 14 and couples rotary power by a shaft connection 21 to a conventional constant speed drive transmission 22 when the coupling mechanism is in a first position. In response to a control signal the coupling mechanism 20 decouples rotary power applied to the input shaft 14 from the constant speed drive (CSD) transmission 22. The transmission 22 has a constant speed output shaft 21' connected to a 3ϕ power generator 23 when the control signal is not present. The CSD transmission 22 converts the variable velocity shaft input coupled thereto by the shaft coupling 21 into a constant velocity output on coupling 21' which drives the electrical generator 23 to produce constant frequency multiple phase electrical power. A magnetic status indicator 24 is contained within the coupling mechanism 20 which provides a visual indication of the status of the connection of the shaft 14 to shaft 21 of the coupling mechanism 20 to ground personnel by opening of the cowling associated with the propulsion engine. The magnetic status indicator relies upon magnetic attraction of two magnets with one of the magnets being connected to a movable part within the coupling mechanism 20 such that when the coupling mechanism is connected, the status indicator button 26 is in a first position and when the coupling mechanism is disconnected, the status indicator button is in the second position.

The magnetic status indicator 24 has not proven in service to be totally reliable in indicating the status of the connection of the input shaft 14 to the CSD transmission 22. Vibration has caused the part in the coupling mechanism 20 on which one of the magnets is mounted to move sufficiently to lose magnetic attraction with the other magnet to cause the button 26 to move to the position indicating disconnection to give a false indication that the coupling mechanism 20 is disconnected. Furthermore, a landing involving high inertial forces has caused the part on which one of the magnets is mounted within the coupling mechanism 20 to move to lose magnetic attraction to cause the button 26 to move to the position indicating disconnection to provide a false indication. A false indication by the button 26 of the magnetic status indicator 24 causes ground personnel to search for a problem within the IDG 16 requiring further inspection to verify that the IDG is operational. The time required for the inspection may delay the aircraft from meeting departure schedules.

DISCLOSURE OF INVENTION

The present invention provides an improved status indicator of the status of a coupling mechanism contained within an IDG or a CSD used for electrical power generation within an airframe. Furthermore, the invention may be utilized in other applications requiring the indication of status of a mechanical connection between a shaft of a transmission and a rotating source of power. With the invention, false indications of the status of the coupling mechanism are avoided by the status indicator being directly controlled by the control signal used for controlling the decoupling of the input shaft of the coupling mechanism from the output shaft of the coupling mechanism. By providing a reliable status indicator, ground delays, consequent from requiring mechanics to inspect the IDG or CSD for possible problems, are avoided.

An indicator for indicating if a shaft is connected to a rotary source of power in accordance with the invention includes a first movable member supported within a case which is movable along a longitudinal axis between first and second positions, the first position indicating that the shaft is connected to the rotary source of power and the second position indicating that the shaft is not connected to the rotary source of power; a second movable member supported in the case which is movable along a longitudinal axis between first and second positions, the second member being adjacent to the first member with the longitudinal axes being parallel; a locking mechanism having first and second positions for retaining the first and second members in the first position to lock the members against relative movement when the locking mechanism is in the first position and permitting relative movement of the members to the second position when the mechanism is in the second position; the movement to the second position causing the shaft to be disconnected from the rotary source of power in response to rotation of the source of power and at least one spring applying a force to the first and second members which forces the first and second members to the second position when the locking mechanism is in the second position. Preferably, the first and second members are coaxial with respect to each other with the first member being disposed around the second member; the locking mechanism projects in a direction transverse to an exterior surface of the first member when moving between the first and second positions; and a third member is provided which is movable along a longitudinal axis between first and second positions having an aperture through which the locking mechanism projects when the third member is in the first position into a cutout area in the exterior surface of the first member, the third member being movable relative at least with respect to the first member through a limited path of motion when the third member moves to the second position and a second spring causing the third member to move to the second position. The coupling mechanism comprises a mechanism for moving the shaft between first and second positions, the first position of the shaft occurring when the shaft is connected to the rotary source of power and the second position of the shaft occurring when the third member has moved to the second position. The mechanism for moving the shaft between the first and second positions comprises a threaded end carried by the third member; a threaded worm carried by the shaft with the threaded end engaging threads of the worm when the third member moves to the second position; and a spring for causing the third member to move to the second position when the locking mechanism moves to the second position.

A travel limiter is provided for limiting relative motion between the first and second members. The travel limiter includes a slot cut in a wall of the second member and through the first member with the slot extending longitudinally along the first and second members and defining an amount of relative movement which may occur between the first and second members and a pin engaging the slot and mounted within a case which contains the members.

The invention further includes a bore within the case which contains the members. A cap is joined to the bore on an exterior surface of the case. A first compressed spring engages an interior surface of the cap and an end of the third member. A second compressed spring engages an end of the second member and a shoulder of the third member. The third member is movable relative to the first member and a pin is contained in one of the first and third members and a slot is disposed within the other of the first and third members with the pin extending from one of the first and third members into the slot of the other of the first and third members, the slot defining an amount of possible relative motion between the first and this members.

An electromagnetically activated coupling mechanism controls the connection of the rotary source of power to the shaft with the coupling mechanism decoupling the shaft from the rotary source of power when a control signal is applied; and the locking mechanism is electromagnetically controlled by the control signal to cause the locking mechanism to be positioned in the second position in response to the control signal and to be positioned in the first position in the absence of the control signal. The indicator may be mounted in a case of a constant speed drive transmission contained in either an IDG or CSD. The constant speed drive transmission has an input shaft connectable to a variable rotational velocity source of power and an output shaft which rotates at a constant velocity in response to rotation of the input shaft for driving an electrical power generator. The first and second movable members each have an end which protrudes from the case, when the movable members are positioned in the first position, the ends are flush with each other, and when the movable members are positioned in the second position, one of the ends protrudes from the case a greater distance than a distance the other end protrudes. The positional relationship of the ends permits reliable visual and tactile inspection of the status of the coupling mechanism.

An indicator for indicating status if a shaft is connected to a rotary source of power in accordance with the invention includes a first member supported within a case and a second member supported within a case which are movable longitudinally relative to each other between first and second relative positions, the first relative position indicating that the shaft is connected to the rotary source of power and the second relative position indicating that the shaft is not connected to the rotary source of power; a locking mechanism having first and second positions for respectively retaining the first and second members in the first position to lock the members against relative movement and permitting relative movement of the members when the locking mechanism is in the second position the movement to the second position causing the shaft to be disconnected from the rotary source of power in response to rotation of the rotary source of power; and at least one spring applying a force to the and second members which forces the first and second members into the second position when the locking mechanism is in the second position. The first and second members are coaxial with respect to each other with the first member being disposed around the second member; the locking mechanism projects in a direction transverse to an exterior surface of the first member when moving between the first and second positions; and further a third member is provided which is movable along a longitudinal axis parallel to the longitudinal axis of the first member between first and second positions, the third member having an aperture through which the locking mechanism projects when the third member is in the first position to engage first member, the third member being movable relative to the first member through a limited path of motion when the third member moves to the second position; and a spring causing the third member to move to the second position. A controlled coupling mechanism which controls the disconnection of the rotary source of power to the shaft with the coupling mechanism decoupling the connection of the shaft to the rotary source of power when a control signal is applied; and the locking mechanism is controlled by the control signal to cause the locking mechanism to be positioned in the second position in response to the control signal and to be positioned in the first position in the absence of the control signal. The coupling mechanism includes a mechanism for moving the shaft between first and second positions, the first position of the shaft occurring when the shaft is connected to the rotary source of power and the second position of the shaft occurring when the third member has moved to the second position. The mechanism includes a threaded end carried by the third member; a worm carried by the shaft with the threaded end engaging threads of the worm when the third member moves to the second position; and a spring causing the third member to move to the second position when the locking mechanism moves to the second position. The indicator is mounted in the case of a constant speed drive transmission, the constant speed drive transmission having an input shaft connectable to a variable rotational velocity source of rotary power and an output shaft which rotates at a constant velocity in response to rotation of the input shaft. The first and second members each have an end which protrudes from a case containing the members, when the movable members are positioned in the first relative position the ends are flush with each other, and when the movable members are positioned in the second relative position, one of the ends protrudes from the case a greater distance than a distance the other end protrudes from the case. The constant speed drive transmission preferably receives power from an aircraft propulsion engine and drives a three-phase generator with a constant rotational velocity to produce three phase constant frequency electrical power. The constant speed drive transmission may be contained within an integrated drive generator or a constant speed drive.

A travel limiting mechanism is provided for limiting relative motion between the first and second members. The travel limiting mechanism includes a slot cut out in a wall of the second member and through the first member with the slot extending longitudinally along the first member and the second member and defining an amount of relative movement which may occur between the first and second members and a pin engaging a grounding mechanism at points on opposed sides of the first member and extending into the slot. A bore is contained in a case which contains the members. A cap is joined to the bore on an exterior surface of the case with the grounding mechanism being part of the cap. A first compressed spring engages an interior surface of the cap and an end of the third member. A second compressed spring engages an end of the second member and a shoulder of the third member. The third member is movable relative to the first member and is contained in one of the first and third members and a slot is disposed within the other of the first and third members with the pin extending from the one of the first and third members into the slot of the other of the first and third members, the slot defining an amount of possible relative motion between the first and third members.

BEST MODE FOR CARRYING OUT THE INVENTION

Figure 1:
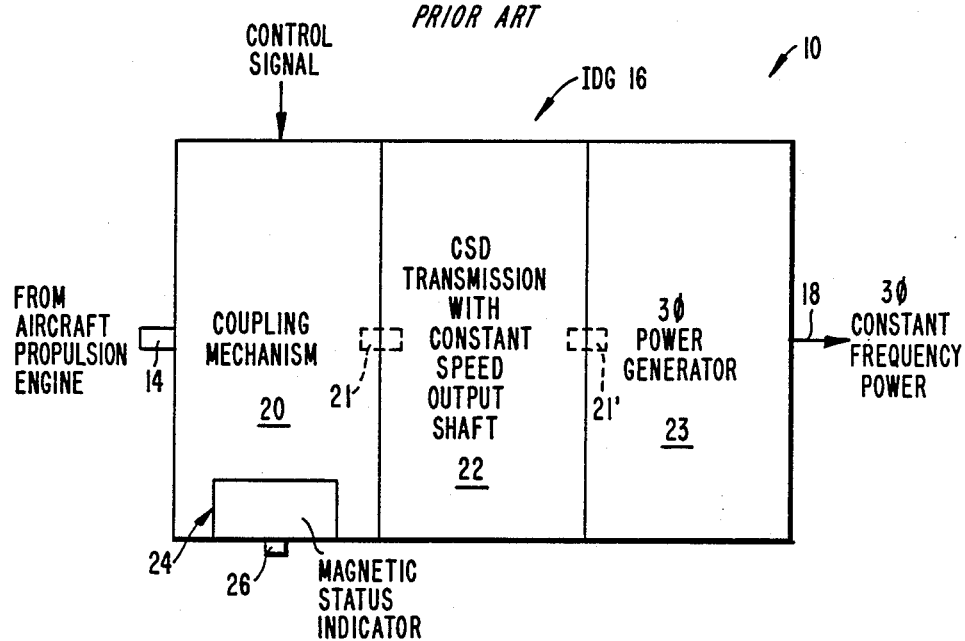
FIG. 1 is a schematic of a prior art IDG magnetic status indicator for indicating the status of a connection between an aircraft propulsion engine and a constant speed drive transmission.
Figure 2:
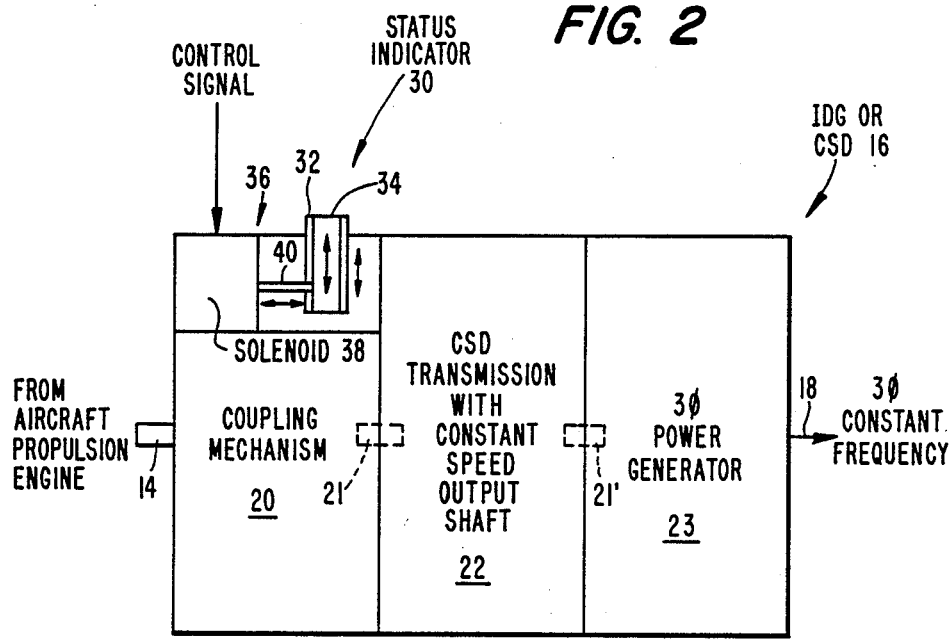
FIG. 2 is a schematic of a status indicator in accordance with the present invention as applied to an IDG.
Figure 3:
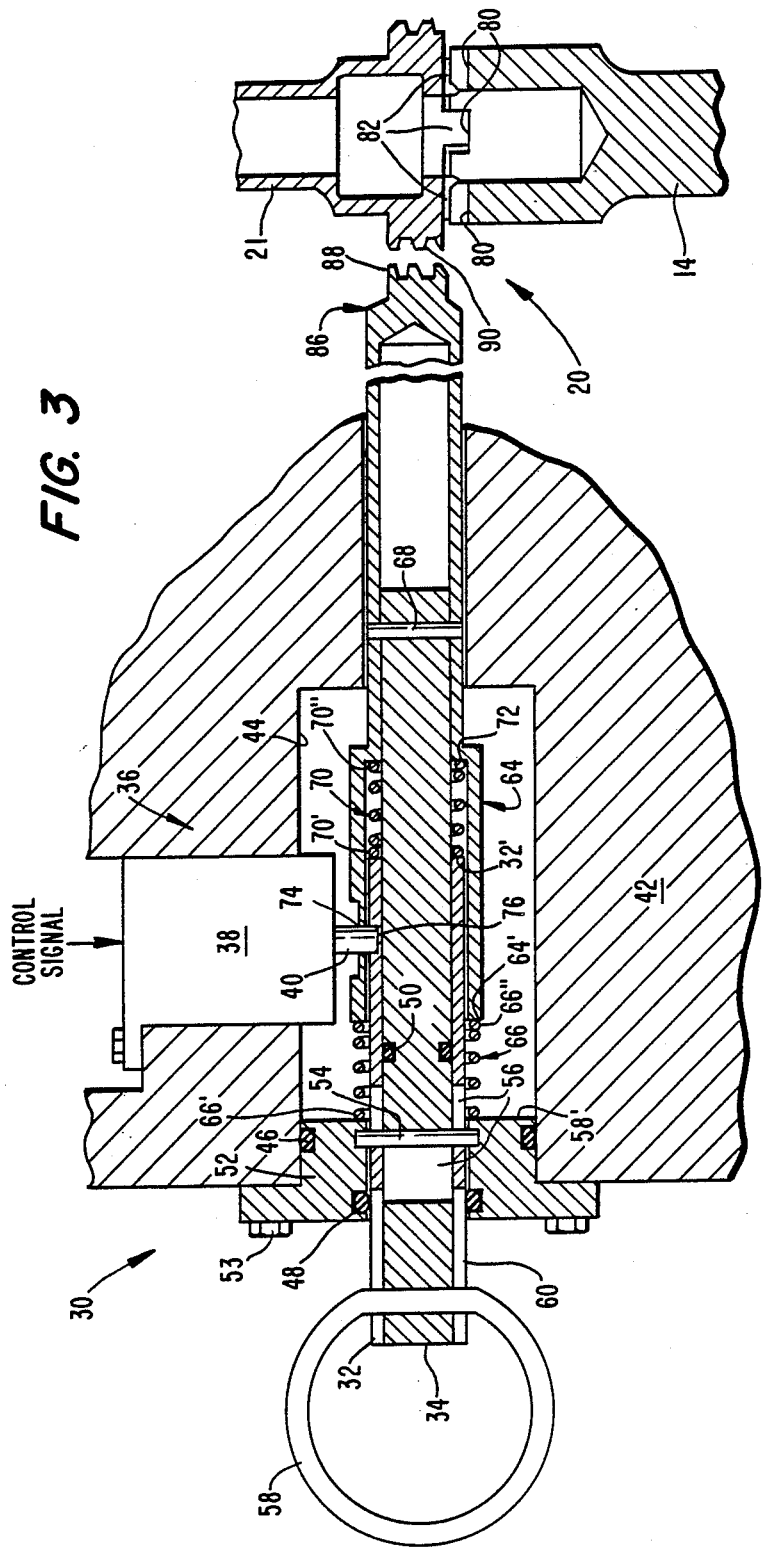
FIG. 3 illustrates a preferred embodiment of a status indicator in accordance with the invention which indicates the status of the connection of an input shaft to a constant speed drive transmission.

FIG. 2 illustrates a schematic of the present invention utilized in an IDG 16. It should be understood that like reference numerals in FIGS. 1 and 2 identify like parts. While the invention is preferably applied to an IDG 16 or CSD used in an airframe for the generation of electrical power, it should be understood that the invention is applicable to other applications where it is desired to indicate the status of a connection between a shaft of a transmission and a rotary source of power. Indicator 30 has first and second movable members 32 and 34 which are movable relative to each other along longitudinal axis which are parallel. The actual connection between the indicator 30 with the coupling mechanism 20 has been omitted from FIG. 2 for purposes of clarity and is described below with reference to FIG. 3. Two possible degrees of relative motion of the first and second members 32 and 34 are possible. Both of the members 32 and 34 may be movable between first and second longitudinal positions. Alternatively, either one of the first and second members 32, 34 may be fixed to a case of the IDG or CSD 16 and the other of the first or second member may be movable between first and second longitudinal positions to provide first and second relative positions of the first and second members. As indicated, when the ends of the movable members are flush with each other, the indicator indicates that the input shaft 14 is coupled to the transmission 22 and three phase electrical power generator section 23 of the IDG 16 by the coupling mechanism 20. A locking mechanism 36 functions to lock the first and second movable members in a first position at which relative movement cannot occur as illustrated in FIG. 2. The locking mechanism is controlled by a solenoid 38 which is activated by the control signal which is applied to the coupling mechanism 20 to cause decoupling of the input shaft 20 from the transmission 22. Solenoid 38 has a movable plunger 40 which moves between first and second positions. When the control signal is not applied, the plunger 40 is spring biased by a spring (not illustrated) into the first position at which the members are locked against relative movement with respect to each other. When the control signal is applied to the solenoid 38, the plunger 40 is withdrawn to the second position against the force applied by the spring. In the first position, as illustrated, the plunger 40 extends into engagement with the first member 32 preferably with an exterior surface thereof. As illustrated, the plunger extends through an aperture in the third member 64 to engage the cutout area of the first member. However, as discussed below with reference to FIG. 3, a third member may be used with the first and third members being either connected or free to move relative to each other over a limited travel defined by a slot in the third member or first member and a pin secured by the other of the first or third member. One or more springs, as discussed below with reference to FIG. 3, are provided to apply relative force between the first and second members 32 and 34 to cause the first and second members to move relative to each other when the plunger 40 is withdrawn to the second position (not illustrated). When the plunger 40 is withdrawn by the presence of the control signal, the ends of the plungers 32 and 34 are no longer flush with each other which permits both a visual and tactile verification to be made by a mechanic upon opening up of the cowling of the propulsion engine compartment of the airframe to indicate the disengaged status of the coupling mechanism 20. The status indicator of the invention is not subject to false indications caused by vibration or hard landings as described above with reference to the prior art of FIG. 1 for the reason that the control signal used for the coupling mechanism 20 is also used to control the status of the status indicator 30.

The solenoid will not permit decoupling of the coupling mechanism under conditions of vibration or hard landings.

Figure 3B:
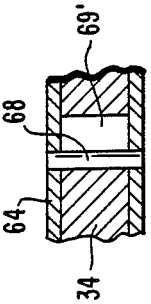
FIG. 3B is a second alternative embodiment in which the first and third members are movable relative to each other.
Figure 3A:
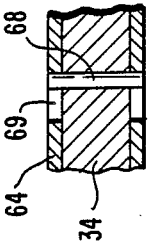
FIG. 3A is a first alternative embodiment in which the first and third members are movable relative to each other.

FIG. 3 illustrates a first embodiment of a status indicator 30 of the present invention in the position at which the input shaft 14 of FIG. 2 is engaging the transmission 22 through the coupling mechanism 20. The indicator 30 is mounted in the wall 42 of the case of the IDG 16 within bore 44. The first member 32 is concentric with the second member 34. As indicated, ends of the first and second members 32 and 34 which protrude past the case are flush to provide both a visual and tactile indication that the input shaft 14 is coupled to the CSD transmission by the coupling mechanism 20. As illustrated, the first member 32 and the second member 34 are each longitudinally movable between first and second positions with respect to wall 42. Alternative embodiments of the invention in which only one of the first and second members 32 and 34 is movable are discussed below. Suitable oil seals 46, 48 and 50 prevent the passage of pressurized oil from the interior of the case (not illustrated) to the exterior through the bore 44. A cap 52 is mounted at the opening of the bore 44 by connectors 53. Pin 54 diametrically engages the first and second members 32 and 34 through slots 56 which extends through a wall of the first member and through the second member and provides a travel limit of relative motion of the second member 34 with respect to the first member 32. As illustrated, the pin 54 is grounded to the cap 52 which is connected to the case wall 42. Alternatively the pin 54 may be connected to the second member and free to move relative to the first member 32 and the cap 52 by the provision of a slot in the first member and the cap. The slots 56 permit the longitudinal axis of the first member 32 to move with respect to the longitudinal axis of the second member 34 to the extent that the members move relative to the pin 54 within the slot 56. A ring 58 engages the second member 34 through a diametrical bore extending through the second member to permit the second member to be longitudinally moved by pulling on the ring. A slot 60 extends in the wall of the first member 32 to permit movement of the ring 58 with respect to the first member 32. The plunger 40 of the solenoid 38 moves between first and second positions. As illustrated, the plunger 40 is in the first position which locks the members 32 and 34 against relative longitudinal movement with respect to each other. As described above, the solenoid 38 contains a spring (not illustrated) which biases the plunger 40 in the position as illustrated in the absence of the control signal. The control signal causes the plunger to be withdrawn toward the solenoid to its second position. As illustrated, the locking mechanism 36 is in the first position at which the first and second members are not movable relative to each other. A third member 64 is concentric with the first member 32 and is longitudinally movable with respect thereto. A first compressed spring 66 provides a force which is exerted between the cap 52 and the third member 64 to cause the third member to move to the right when the plunger 40 is withdrawn to its second position. A first end 66' of the compressed spring 66 engages an interior surface 58' of the cap 52 and a second end 66" engages left end 64' of the third member 64. As illustrated in FIG. 3, pin 68 extends through the third member 64 into the second member 34 to connect the second and third members together so that relative motion between the second and third members does not occur. Alternatively, a longitudinal slot 69, as illustrated in FIG. 3A, is provided in the third member 64, which engages the pin 68 which is fixed to the second member 34 with the length of the slot determining the amount of possible relative motion between the second and third members 34 and 64, respectively. Alternatively, as illustrated in FIG. 3B, slot 69' may be provided in the second member 34 with the pin being fixed to the third member 64. The slots 69 and 69' permit the third member 64 to move a greater distance to the right than the second member 32 when the control signal is applied to the solenoid 38 when both indicators 32 and 34 are longitudinally movable. If the second member 34 is fixed, the slots 69 or 69' are necessary to permit the third member to move to the right during disconnection of input shaft 14 from shaft 21. A second compressed spring 70 applies force to the first and third members 32 and 64 to cause motion of the first member 32 to the left and motion of the third member to the right when the plunger 40 is withdrawn. The second spring 70 applies the force to the first member 32 by riding on shoulder 72. The third member 64 has an aperture 74 through which the plunger 40 projects when it is positioned in the first position. The first member 32 has a cutout area 76 which engages the end of the plunger 40 when it is in its first position to lock the first and second members 32 and 34 in the flush position as illustrated which indicates the connection of the input shaft 14 to the section 22 through the coupling mechanism 20.

The coupling mechanism 20 is described as follows. The input shaft 14 has at least one recess 80 which engages corresponding dog teeth 82 in shaft 21 which is movable between first and second positions. The shaft 21 is illustrated in its first position when power is applied from input 14 to the CSD transmission 22. The third member 64 has an end 86 which carries threads 88. When the solenoid 38 is activated by the control signal, the plunger 40 is withdrawn which causes the third member 64 to move to the right under the force applied by spring 70 which causes the threads 88 to engage threads 90 on the shaft 21 which causes the shaft to translate to the left to disengage the dog teeth 82 from the recesses 80 to disconnect the shaft 14 from the shaft 21. As soon as the indicator 30 is reset by pulling the third member to its first position, as illustrated, a spring causes the shaft 21 to shift to its first position.

Figure 4:
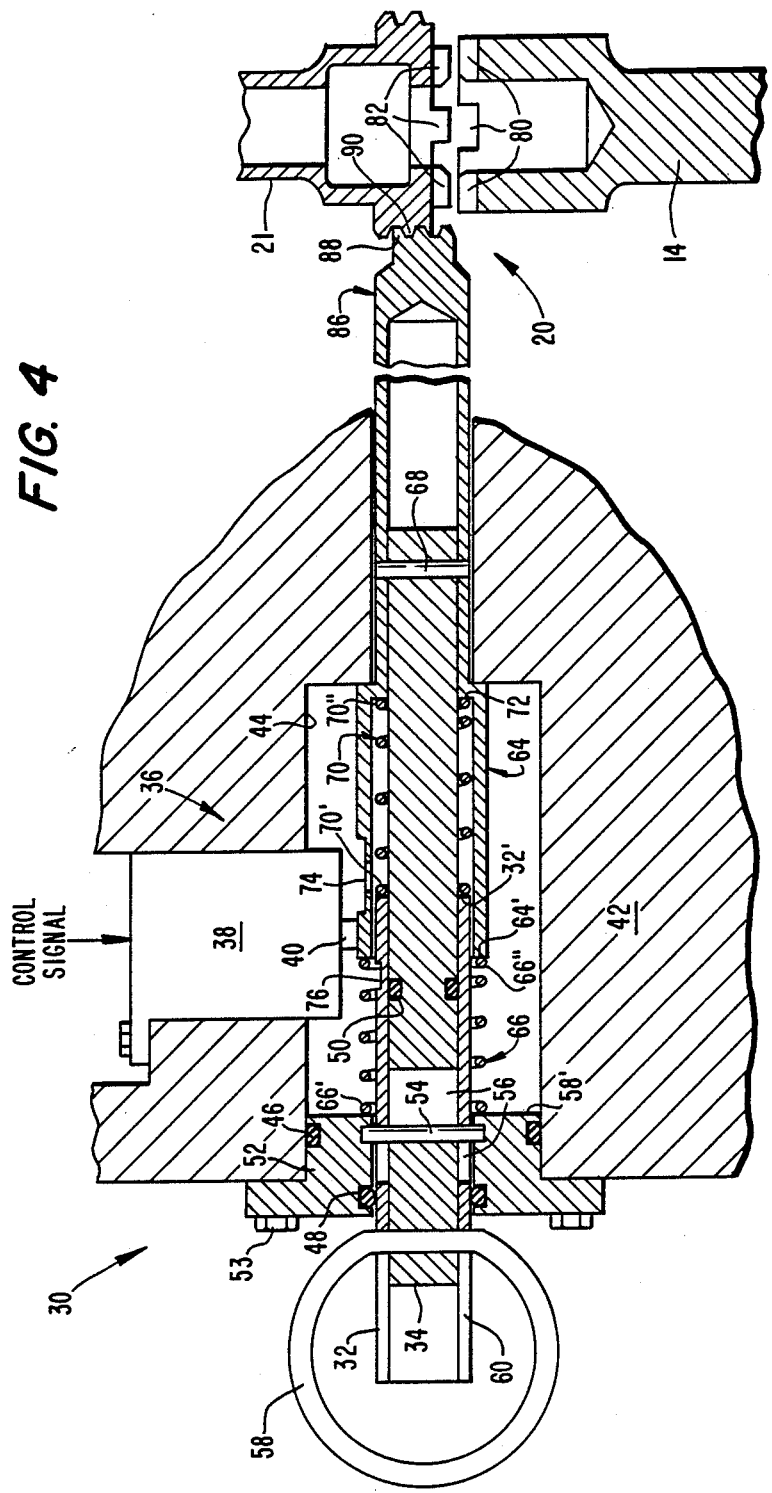
FIG. 4 illustrates the embodiment of FIG. 3 when the input shaft is disconnected from the constant speed drive transmission.
Figure 4A:
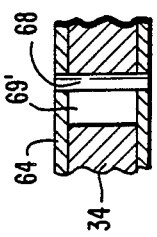
FIG. 4A illustrates the alternative embodiment of FIG. 3A after the solenoid has been activated.
Figure 4B:
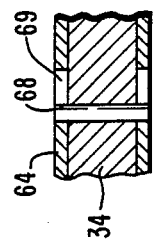
FIG. 4B illustrates the alternative embodiment of FIG. 3B after the solenoid has been activated.

FIG. 4 illustrates the indicator 30 when the input shaft 14 is disconnected from the CSD transmission 22 by the coupling mechanism 20. Like reference numerals identify like parts in FIGS. 3 and 4. As illustrated, the plunger 40 of the solenoid 38 has been withdrawn to its second position which permits the compressed springs 66 and 70 to expand to cause the first member 32 to move longitudinally to the left, third member 64 to move longitudinally to the right and the second member 34 to move longitudinally to the right. As a result, the ends of the first and second members 32 and 34 are no longer flush which provides both a visual and tactile indication of the status of the input shaft 14 as not being connected to the section 22 of the IDG 16 by the coupling mechanism 20. As illustrated, the locking mechanism 36 is in its second position. FIG. 4A illustrates the embodiment of FIG. 3A with the shaft 14 disengaged from the shaft 21. FIG. 4B illustrates the embodiment of FIG. 3B with the shaft 14 disengaged from the shaft 21.

To reset the status indicator 30, the ring 58 is pulled to the left, which moves the second member 32 and third member 64 to the left, while simultaneously the first member 32 is pushed to the right to cause the plunger 40 to drop through the aperture 74 and engage the cutout area 76 of the first member to lock the first and second members longitudinally with respect to each other as illustrated in FIG. 3. The force exerted by the compressed springs 66 and 70 and the force applied by the spring within the solenoid 38 to the plunger 40 maintains the members in the first locked position of the locking mechanism 36 which prevents vibration or high inertial forces from landing to cause a false status indication.

It is within the scope of the present invention for one of the members 32 and 34 to be fixed with the other member being movable between first and second positions. For example, the pin 54 may be connected to the second member 34 without providing for relative motion which is permitted by slot 56 as illustrated.

While the invention has been described in terms of its preferred embodiments, it should be understood that numerous modifications may be made thereto without departing from the spirit and scope of the invention as defined in the appended claims. For example, while the preferred application of the present invention is in airframes having IDGs or CSDs, it should be understood that the invention may be utilized in any application requiring an indication of the status of the connection between a shaft of a transmission and a rotary source of power.

I claim:

1. An indicator for indicating if a shaft is connected to a rotary source of power comprising:
    a first movable member supported at least partially within a case which is movable along a longitudinal axis between first and second positions, the first position indicating that the shaft is connected to the rotary source of power and the second position indicating that the shaft is not connected to the rotary source of power;
    a second movable member supported at least partially within the case which is movable along a longitudinal axis between first and second positions, the first position indicating that the shaft is connected to the rotary source of power and the second position indicating that the shaft is not connected to the rotary source of power, the second member being adjacent to the first member;
    a locking mechanism having first and second positions for retaining the first and second members in the first position to lock the members against relative movement when the locking mechanism is in the first position and permitting relative movement of the members to the second position when the locking mechanism is in the second position, the movement of the locking mechanism to the second position enabling at least one of the members to move, which movement causes the shaft to be disconnected from the rotary source of power in response to rotation of the rotary source of power; and
    a first spring applying a force to the first and second members which forces the first and second members to the second position when the locking mechanism is in the second position.

2. An indicator in accordance with claim 1 wherein:
    the first and second members are coaxial with respect to each other with the first member being disposed around the second member;
    the locking mechanism projects in a direction transverse to an exterior surface of the first member when moving between the first and second positions; and further including
    a third member which is movable along a longitudinal axis between first and second positions, the third member having an aperture through which the locking mechanism projects when the third member is in the first position into a cutout area in the exterior surface of the first member, the third member being movable relative at least with respect to the first member through a limited path of motion when the third member moves to the second position which movement disconnects the shaft from the rotary source of power; and a second spring for causing the third member to move to the second position.

3. An indicator in accordance with claim 2 further comprising:
    a controlled coupling mechanism which controls the connection of the rotary source of power to the shaft with the coupling mechanism decoupling the connection of the shaft from the rotary source of power in response to the third member moving to the second position; and
    the locking mechanism is controlled by a control signal which causes the locking mechanism to be positioned in the second position in response to the control signal and can be positioned in the first position in the absence of the control signal.

4. An indicator in accordance with claim 3 wherein the coupling mechanism comprises:
    means for moving the shaft between first and second positions, the first position of the shaft occurring when the shaft is connected to the rotary source of power and the second position of the shaft occurring when the third member has moved to the second position.

5. An indicator in accordance with claim 4 wherein the means comprises:
    a threaded end carried by the third member;
    a threaded worm carried by the shaft with the threaded end engaging threads of the worm when the third member moves to the second position; and
    wherein the second spring causes the third member to move to the second position when the locking mechanism moves to the second position.

6. An indicator in accordance with claim 5 wherein:
    the indicator is mounted in the case in a constant speed drive transmission, the constant speed drive transmission having an input shaft connectable to a variable rotational velocity source of rotary power and an output shaft which rotates at a constant velocity in response to rotation of the input shaft, wherein the indicator indicates the connection between the input shaft and source of rotary power.

7. An indicator in accordance with claim 1 wherein:
    the first and second movable members each have an end which protrudes from the case containing the members, when the movable members are positioned in the first position the ends are flush with each other, and when the movable members are positioned in the second position one of the ends protrudes from the case a greater distance than a distance the other end protrudes from the case.

8. An indicator in accordance with claim 6 wherein:

the first and second movable members each have an end which protrudes from the case containing the members, when the movable members are positioned in the first position the ends are flush with each other, and when the movable members are positioned in the second position one of the ends protrudes from the case a greater distance than a distance the other end protrudes from the case.

9. An indicator in accordance with claim 3 further comprising:
a constant speed drive transmission coupled to the shafts which receives rotary power from an aircraft propulsion engine and drives a three phase generator with a constant rotational velocity to produce three phase constant frequency electrical power.

10. An indicator in accordance with claim 4 further comprising:
a constant speed drive transmission coupled to the shaft, which receives rotary power from an aircraft propulsion engine and drives a three phase generator with a constant rotational velocity to produce three phase constant frequency electrical power.

11. An indicator in accordance with claim 5 further comprising:
a constant speed drive transmission coupled to the shaft which receives rotary power from an aircraft propulsion engine and drives a three phase generator with a constant rotational velocity to produce three phase constant frequency electrical power.

12. An indicator in accordance with claim 9 wherein:
the constant speed drive transmission is contained within an integrated drive generator.

13. An indicator in accordance with claim 2 further comprising:
travel limiting means for limiting relative motion between the first and second members.

14. An indicator in accordance with claim 13 wherein:
the travel limiting means includes a slot cut out in a wall of the second member and a slot cut in the first member with the slots extending longitudinally along the first member and the second member and defining an amount of relative movement which may occur between the members and a pin engaging the slots and mounted within the case which contains the members.

15. An indicator in accordance with claim 2 further comprising:
a bore within the case which contains the members;
a cap joined to the bore on an exterior surface of the case; and wherein
the first spring is a compressed spring engaging an end of the first member and a shoulder of the third member; and
the second spring is a compressed spring engaging an interior surface of the cap and an end of the third member.

16. An indicator in accordance with claim 15 wherein:
the third member is movable relative to the second member and a pin is contained in one of the second and third members and a slot is disposed within the other of the second and third members with the pin extending from the one of the second and third members into the slot of the other of the second and third members, the slot defining an amount of relative motion between the second and third members.

17. An indicator for indicating status if a shaft is connected to and a rotary source of power comprising:
a first member supported at least partially within a case and a second member supported at least partially within the case which are movable longitudinally relative to each other between first and second relative positions, the first relative position indicating that the shaft is connected to the rotary source of power and the second relative position indicating that the shaft is not connected to the rotary source of power;
a locking mechanism having first and second positions for retaining the first and second members in the first position to lock the members against relative movement when the locking mechanism is in the first position and permitting relative movement of the members to the second position when the locking mechanism is in the second position, the movement of the locking mechanism to the second position enabling at least one of the members to move, which movement causes the shaft to be disconnected from the rotary source of power in response to rotation of the rotary source of power; and
a first spring applying a force to the first and second members which forces the first and second members to the second position when the locking mechanism is in the second position.

18. An indicator in accordance with claim 17 wherein:
the first member is movable along a longitudinal axis between first and second positions, the first position indicating that the shaft is connected to the rotary source of power and the second position indicating that the shaft is not connected to the rotary source of power.

19. An indicator in accordance with claim 18 wherein:
the second member is fixed with respect to a bore within the case which contains the first and second members.

20. An indicator in accordance with claim 17 wherein:
the first and second members are coaxial with respect to each other with the first member being disposed around the second member;
the locking mechanism projects in a direction transverse to an exterior surface of the first member when moving between the first and second positions; and further including
a third member which is movable along a longitudinal axis relative to the longitudinal axis of the first member between first and second positions, the third member having an aperture through which the locking mechanism projects when the third member is in the first position into a cutout area in the exterior surface of the first member, the third member being movable through a limited path of motion when the third member moves to the second position; and a second spring for causing the third member to move to the second position.

21. An indicator in accordance with claim 20 further comprising:
a controlled coupling mechanism which controls the connection of the rotary source of power to the shaft with the coupling mechanism decoupling the connection of the shaft from the rotary source of power in response to the third member moving to the second position; and the locking mechanism is controlled by a control signal which causes the locking mechanism to be positioned in the second position in response to the control signal and can be positioned in the second position in the absence of the control signal.

22. An indicator in accordance with claim 21 wherein the coupling mechanism comprises:

means for moving the shaft between first and second positions, the first position of the shaft occurring when the shaft is connected to the rotary source of power and the second position of the shaft occurring when the third member has moved to the second position.

23. An indicator in accordance with claim 22 wherein the means comprises:

a threaded end carrier by the third member;

a threaded worm carried by the shaft with the threaded end engaging threads of the worm when the third member moves to the second position; and the second spring causes the third member to move to the second position when the locking mechanism moves to the second position.

24. An indicator in accordance with claim 23 wherein:

the indicator is mounted in the case in a constant speed drive transmission, the constant speed drive transmission having an input shaft connectable to a variable rotational velocity source of rotary power and an output shaft which rotates at a constant velocity in response to rotation of the input shaft, wherein the indicator indicates the connection between the input shaft and source of rotary power.

25. An indicator in accordance with claim 24 wherein:

the first and second members each have an end which protrudes from the case containing the members, when the movable members are positioned in the first relative position the ends are flush with each other, and when the movable members are positioned in the second relative position one of the ends protrudes from the case a greater distance than a distance the other end protrudes from the case.

26. An indicator in accordance with claim 25 further comprising:

a constant speed drive transmission coupled to the shaft, which receives rotary power from an aircraft propulsion engine and drives a three phase generator with a constant rotational velocity to produce three phase constant frequency electrical power.

27. An indicator in accordance with claim 25 wherein:

the constant speed drive transmission is contained within an integrated drive generator.

28. An indicator in accordance with claim 20 further comprising:

travel limiting means for limiting relative motion between the first and second members.

29. An indicator in accordance with claim 28 wherein:

the travel limiting means includes a slot cut out in a wall of the second member and through the first member with the slots extending longitudinally along the first member and the second member and defining an amount of relative movement which may occur between the first and second members and a pin engaging a grounding mechanism at points on opposed sides of the first member and extending into the slots.

30. An indicator in accordance with claim 29 further comprising:

a bore within the case which contains the members;

a cap joined to the bore on an exterior surface of the case with the grounding mechanism being part of the cap; and wherein the first spring is a compressed spring engaging an end of the first member and a shoulder of the third member; and the second spring is a compressed spring engaging an interior surface of the cap and an end of the third member.

31. An indicator in accordance with claim 30 wherein:

the third member is movable relative to the second member and in one of the second and third members a slot is disposed with a pin extending from the one of the second and third members into the slot of the other of the second and third members, the slot defining an amount of relative motion between the second and third members.

32. An indicator for indicating status if a shaft is connected to a rotary source of power comprising:

a first movable member supported at least partially within a case which is movable along a longitudinal axis between first and second positions, the first position indicating that the shaft is connected to the rotary source of power and the second position indicating that the shaft is not connected to the rotary source of power;

a second movable member supported at least partially within the case which is movable along a longitudinal axis between first and second positions, the first position indicating that the shaft is connected to the rotary source of power and the second position indicating that the shaft is not connected to the rotary source of power, the second member being adjacent to the first member;

a locking mechanism having first and second positions for retaining the first and second members in the first position to lock the members against relative movement when the locking mechanism is in the first position and permitting relative movement of the members to the second position when the locking mechanism is in the second position, the movement of the locking mechanism to the second position enabling at least one of the members to move, which movement causes the shaft to be disconnected from the rotary source of power in response to rotation of the rotary source of power; and a first spring applying a force to at least one of the first and second members which forces the first and second members to the second position when the locking mechanism is in the second position.

* * * * *